United States Patent [19]

Chan

[11] Patent Number: 5,607,158
[45] Date of Patent: Mar. 4, 1997

[54] DETACHABLE JOYSTICK HANDLE

[76] Inventor: Wah L. Chan, Flat L, 12/F, Phase 4, Kwun Tong Industrial Centre, 436-446 Kwun Tong Road, Kowloon, Hong Kong

[21] Appl. No.: 555,544

[22] Filed: Nov. 9, 1995

[30]  Foreign Application Priority Data

Nov. 28, 1994 [GB] United Kingdom .................. 9423971

[51] Int. Cl.$^6$ ....................................... A63F 9/00
[52] U.S. Cl. ...................... 273/148 B; 463/38; 345/161
[58] Field of Search .......................... 273/148 B; 463/36, 463/37, 38, 39, 46, 47; 345/156, 158, 161

[56]  References Cited

U.S. PATENT DOCUMENTS 4,414,438  11/1983  Maier et al. ..................... 345/161 X
4,994,669  2/1991  Stern ............................... 273/148 B X
5,375,831  12/1994  Hsien-chung ..................... 273/148 B

*Primary Examiner*—Raleigh W. Chiu
*Attorney, Agent, or Firm*—Bacon & Thomas

[57]  ABSTRACT

A joystick includes a base and handle, the handle having one or more function buttons which operate switches in response to manipulation of the buttons. The handle is detachably mounted on a pipe extending from the base. Electrical connections for the switches are joined to a socket connector in the handle which receives a printed circuit board or other connector mounted on the top of the pipe, so that electrical connection to the switches is made as the handle is mounted in position.

14 Claims, 3 Drawing Sheets

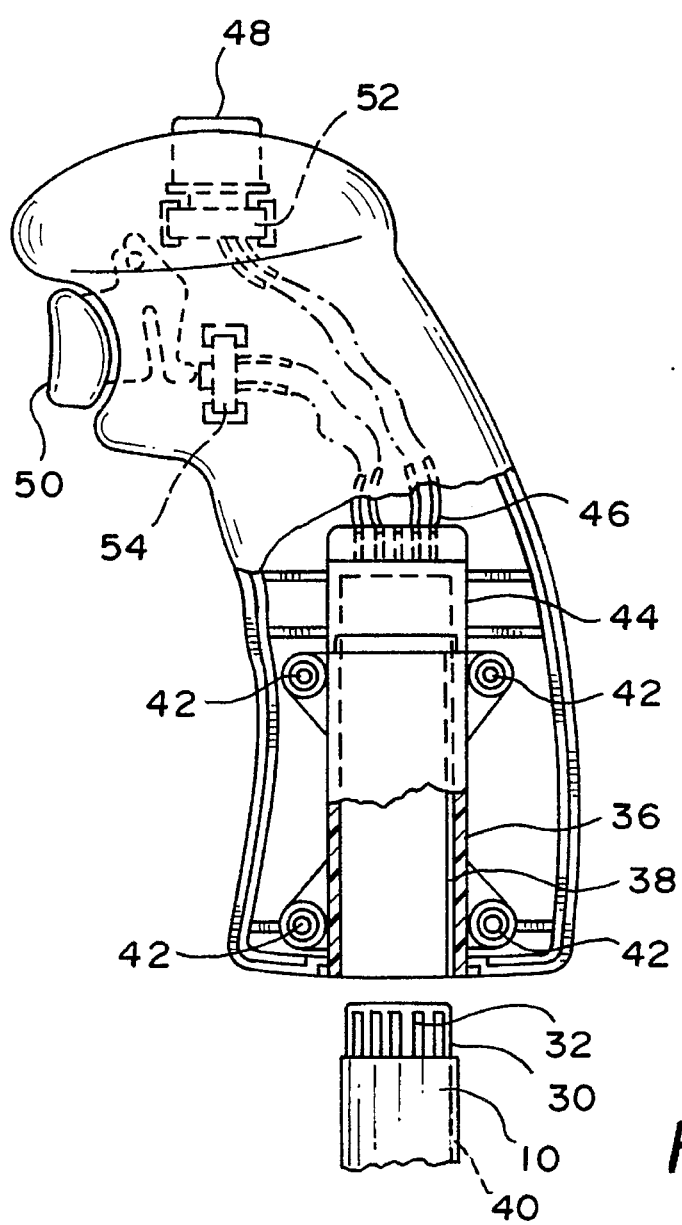
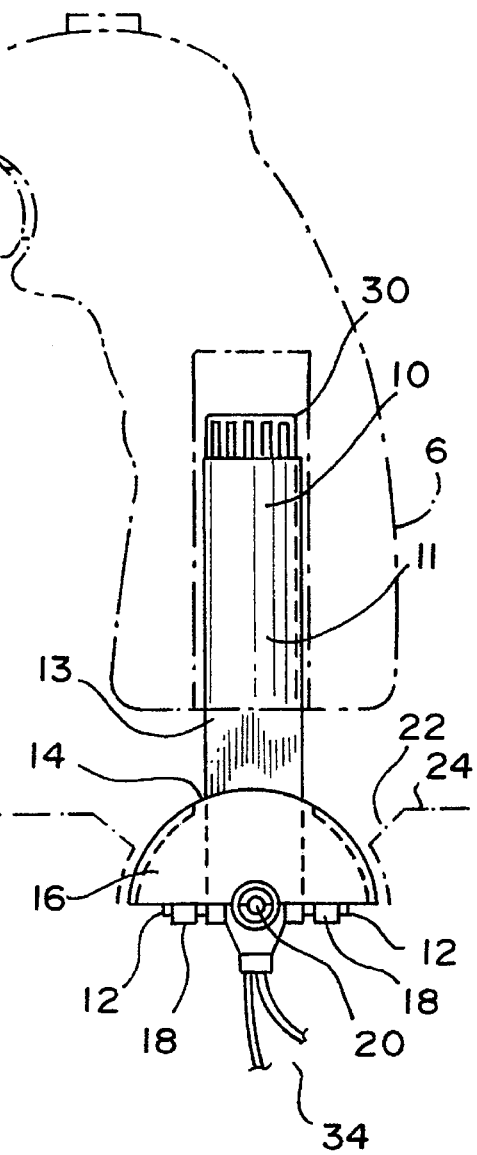

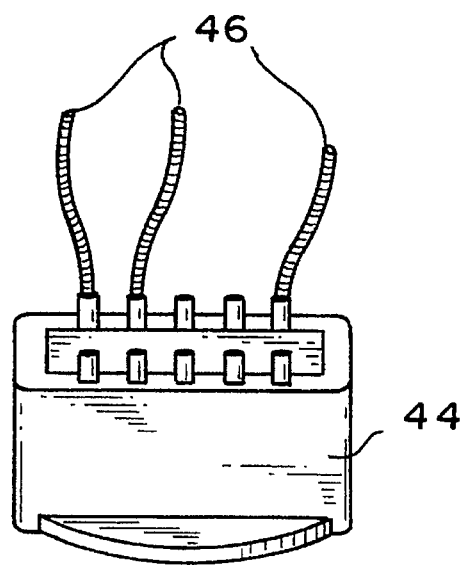
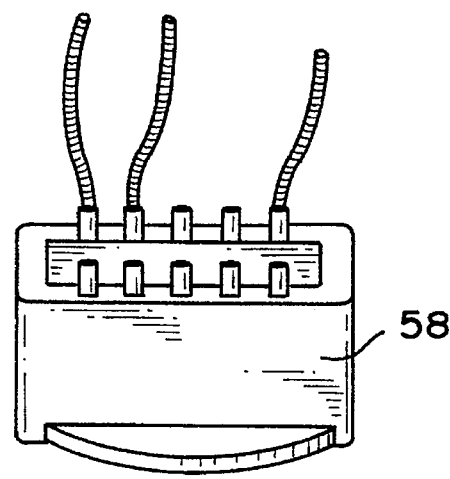
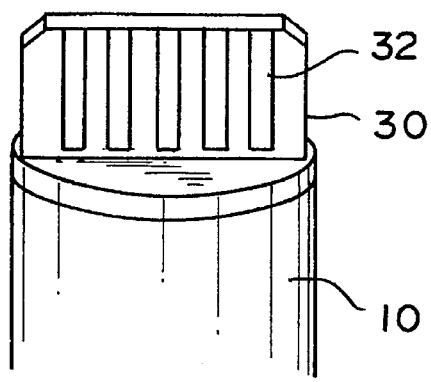
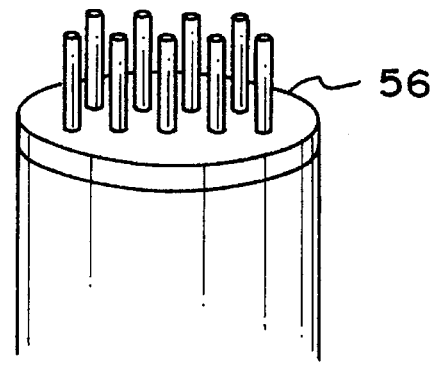
FIG. 4    FIG. 5

DETACHABLE JOYSTICK HANDLE

BACKGROUND OF THE INVENTION

1. Field of the Invention

The present invention relates to joysticks, and in particular to joysticks for use with video games.

2. Description of Related Art

Many video games presently on the market require the use of a joystick to play the game satisfactorily. Typically, movement of the joystick results in the movement of a video image to simulate, for example, the movement of an aircraft, helicopter, or some other vehicle. Furthermore, the joystick will usually have one or more function buttons which can be used, for example, to simulate the firing of one or more weapons.

At the present time, joysticks tend to be dedicated to a particular game or games console, which means that if it is desired to play a different game which may require a different joystick configuration, or if a player requires a joystick of a larger or smaller size, the whole joystick assembly must be replaced, which is both time consuming and, moreover, expensive.

SUMMARY OF THE INVENTION

The present invention seeks to overcome this problem by providing a joystick that includes a handle having actuating means in the form of one or more function buttons or actuators for operating electrical switch or function means to generate electrical signals representative of an operation of the buttons or actuators mounted in the handle, and a base, the handle being detachably mounted on the base and having electrical connection means for the switch or function means which allows detachable engagement with electrical connection means provided in said base.

Thus, in accordance with the invention, a handle which has one or more function buttons or the like may be detachably mounted on a base, and has electrical connection means connected to a switch or other electrical function means operated by the buttons, the electrical connection means being detachably engageable with an electrical-connector in the base. As a result, it is possible to easily change the handle if one of a different shape or size is required, for example, to allow a child to play, or if the joystick is to be used with a game having different playing characteristics requiring a different number or array of function buttons. Furthermore, the detachability of the handle member from the base may enable a reduction in packaging size by as much as 50%, thereby reducing packaging, freight and storage costs.

Preferably, the respective electrical connection means are arranged so as to engage and disengage as the handle is mounted to or removed from the base. This is particularly advantageous as it allows the mechanical and electrical interconnection of the handle and the base to be accomplished simultaneously.

In one preferred embodiment, the base may include a pipe member which is received in a bore in the handle. The pipe and bore may typically be circular in cross-section, and location means, such as a key and keyway, may be provided between the handle and base to ensure the correct angular orientation between them, for example to ensure the correct angular orientation between the respective electrical connection means.

In a particularly preferred embodiment, the base electrical connection means may be mounted at the top of the base pipe member, and the handle electrical connection means aligned with, and preferably mounted adjacent the base of the handle bore.

Preferably the electrical connection means include respective plug and socket components mounted in the handle and base, such as printed circuit board (p.c.b) or pin connectors.

Locking means, for example a set screw, may be provided to lock the handle on the base, to prevent the handle inadvertently being pulled off during use.

The base may include means for permitting movement of the handle about two mutually perpendicular axes, so as to allow an up and down and side-to-side movement of a video image. In a preferred embodiment, the base may be made up of a first base member pivotally mounted to a second base member about a first axis, and a second base member having means for mounting it pivotally on a support for rotation about a second axis, perpendicular to the first axis. The pivotal movement to the respective base members may, in use, be sensed by appropriate means for conversion to an electrical signal to be input to the games console.

BRIEF DESCRIPTION OF THE DRAWINGS

FIG. 2 is a side view of the handle of the joystick of FIG. 1 detached from its base, and again shown partly cut away.

FIG. 3 is a side view of the base of the joystick of FIG. 1.

FIG. 4 is a perspective view of first plug and socket electrical connectors which may be used in a joystick embodying the invention.

FIG. 5 is a perspective view of second plug and socket electrical connectors which may be used in a joystick embodying the invention.

DETAILED DESCRIPTION OF THE PREFERRED EMBODIMENTS

Figure 1:
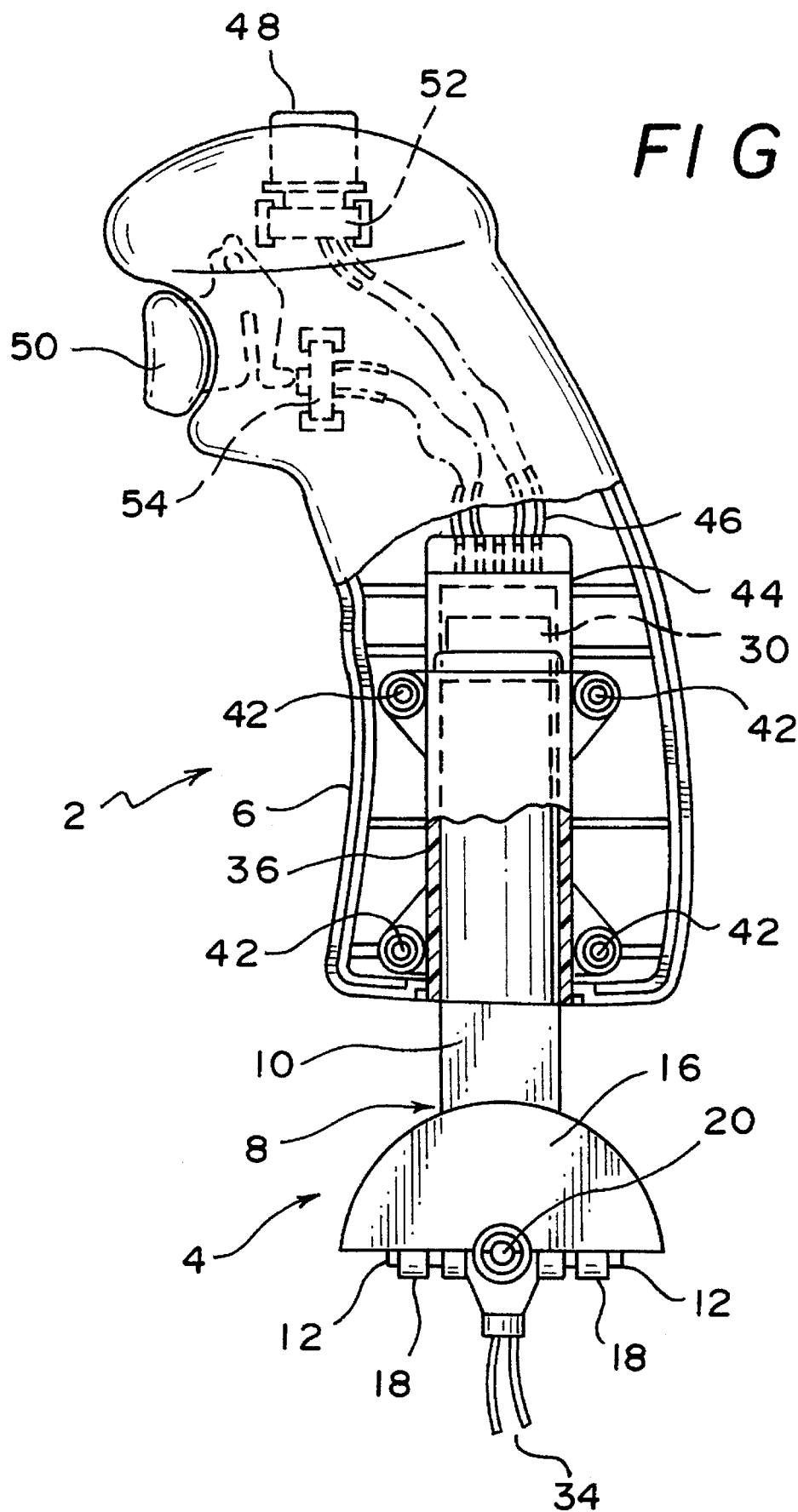
FIG. 1 is a side view of a joystick in accordance with the invention, with the handle shown partly cut away.

With reference to the figures, a joystick 2 includes a base 4 and a handle 6 detachably mounted on the base 4. As can be seen most clearly from FIGS. 1 and 3, the base includes a first base member 8 having a pipe 10 at its upper end and a pair of pivot shafts 12 at its lower end. The pipe 10 extends through a slot 14 provided in the upper surface of a second base member 16. The upper surface of the lower end of the first base member 8 is semi-cylindrical, so that the slot 14 is closed by that surface, irrespective of the angular position of the first base member 8.

The second base member 16 is provided with bearings 18 to receive the pivot shafts 12 of the first base member 8. These bearings 18 may be formed separately from the second base member 16 and mounted thereto, for example by screws (not shown). The second base member 16 is generally semi-cylindrical in shape and is provided with bearing shafts 20 at either end, for pivotal mounting in an opening 22 in a console 24. The bearing shafts 12 and 20 are perpendicular to one another to allow a full range of movement of the joystick 2 once mounted in the consul 24. Spring means (not shown) may be provided to return the joystick to a neutral position and to give 'feel' to its movement.

As can be seen most clearly in FIGS. 2 and 4, an electrical connector in the form of a p.c.b. 30 hoping contact strips 32 is mounted on the top of the pipe 10. The pipe is hollow, so that wires 34 connected to the contact strips 32 can be lead away through an opening provided in the bottom of the first base member 8.

The pipe 10 has an upper part 11 which is circular in cross-section and which is received within a circular cross-section molded tube 36 provided within the handle 6. The inner surface of the tube 36 is provided with a key 38 which engages in a keyway 40 provided in the outer surface of the pipe 10. The base 13 of the pipe 10 is square in cross-section, to provide corner areas on which the handle 6 may locate vertically. The handle 6 is a two-part plastics molding, and the tube 36 is mounted within one half of the handle 6 by screws 42.

An electrical socket connector 44 is mounted in the handle 6 to be aligned with the top of the tube 36, to receive the base p.c.b. connector 30 when the handle 6 is mounted onto the pipe 10. The key 38 and keyway 40 ensure that the handle 6 and base 4 are oriented correctly to allow engagement of the electrical connectors 30,44.

Two buttons 48, 50 are mounted in the handle, and are intended to control different functions of the game with which the joystick 2 is to be used. The buttons 48, 50 operate respective switches 52, 54 mounted within the handle. Electrical connections 46 extend from the connector 44 to the respective switches 52, 54.

A set screw (not shown) extends through the handle molding to engage on the pipe to lock it in position in use.

As will be apparent, when the joystick 2 is in use, movements of the joystick 2 will be detected and input to a game by suitable take-offs from the first and second base members 8,16, and for example, weapon firing functions performed by the buttons 48,50, input to the game through the wires 34. If it is desired to change the handle 6, for example to use a smaller handle 6 for a child, or to use a completely different handle 6 possibly having different function buttons 48,50, for a different game, all that needs to be done is to loosen the set screw, pull the handle 6 off the pipe 10, and position the new handle 6 thereon. The electrical connection between the two parts is made as the handle 6 is pushed into its final position, thereby avoiding the need for a separate electrical connection to be performed. The set screw is then tightened to hold the new handle 6 in position.

Whilst in the embodiment shown the buttons 48,50 operate simple switches 52,54, depending on the particular application, the switches 52, may be other electrical components which may be operated by the buttons or some other form of actuator. Furthermore, as can be seen in FIG. 5, the electrical connectors in the handle and base may be connectors other than p.c.b. connectors, such as a male pin connector 56 in the base 4 and a corresponding socket 58 in the handle 6.

I claim:

1. A joystick, comprising a handle having mounted thereon at least one actuator means for generating electrical signals in response to manipulation of the actuator means; and a base, said handle being detachably mounted on said base and having electrical connection means detachably engageable with electrical connection means provided in said base, said electrical connection means on said handle and said electrical connection means in said base being for transmitting said electrical signals when said handle is mounted on said base.

2. A joystick as claimed in claim 1, wherein said actuator means comprises at least one function button and a switch actuated by said button.

3. A joystick as claimed in claims 1 or 2, wherein the respective electrical connection means are arranged to engage and disengage as the handle is mounted to and removed from the base.

4. A joystick as claimed in claims 1 or 2, wherein location means are provided between the handle and the base to ensure a correct angular orientation therebetween.

5. A joystick as claimed in claims 1 or 2, wherein said base comprises a pipe member which is received in a bore in the handle.

6. A joystick as claimed in claim 5, wherein said pipe member is circular in cross-section over at least part of its length.

7. A joystick as claimed in claim 5, wherein the electrical connection means of the base is mounted at a top of said pipe member, and the electrical connection means of the handle is aligned with said bore.

8. A joystick as claimed in claim 7, wherein said handle electrical connection means is mounted adjacent one end of said bore.

9. A joystick as claimed in claims 1 or 2, wherein said electrical connection means comprise respective plug and socket connectors.

10. A joystick as claimed in claim 9, wherein said plug connector is a printed circuit board connector.

11. A joystick as claimed in claim 9, wherein said plug connector is a pin connector.

12. A joystick as claimed in claims 1 or 2, wherein locking means are provided for locking said handle on said base.

13. A joystick as claimed in claims 1 or 2, wherein said base comprises means for permitting movement of the handle about two mutually perpendicular axes.

14. A joystick as claimed in claim 13, wherein said base comprises a first base member pivotally mounted to a second base member about a first axis.

* * * * *